United States Patent
Ko et al.

(10) Patent No.: US 10,454,521 B2
(45) Date of Patent: Oct. 22, 2019

(54) METHOD AND APPARATUS FOR RANDOMIZATION OF INTERFERENCE IN CELLULAR INTERNET OF THINGS (IOT) SYSTEM

(71) Applicant: LG ELECTRONICS INC., Seoul (KR)

(72) Inventors: Hyunsoo Ko, Seoul (KR); Bonghoe Kim, Seoul (KR); Yunjung Yi, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 15/739,518

(22) PCT Filed: Mar. 22, 2016

(86) PCT No.: PCT/KR2016/002837
§ 371 (c)(1),
(2) Date: Dec. 22, 2017

(87) PCT Pub. No.: WO2016/208848
PCT Pub. Date: Dec. 29, 2016

(65) Prior Publication Data
US 2018/0175904 A1    Jun. 21, 2018

Related U.S. Application Data

(60) Provisional application No. 62/183,740, filed on Jun. 24, 2015.

(51) Int. Cl.
*H04B 1/713* (2011.01)
*H04L 5/00* (2006.01)
(Continued)

(52) U.S. Cl.
CPC ............ *H04B 1/713* (2013.01); *H04J 11/005* (2013.01); *H04L 5/00* (2013.01); *H04L 5/0012* (2013.01);
(Continued)

(58) Field of Classification Search
CPC .......... H04B 1/713; H04J 11/005; H04L 5/00; H04L 5/0012; H04L 5/0044;
(Continued)

(56) References Cited

U.S. PATENT DOCUMENTS

| 2013/0136098 A1 | 5/2013 | Li et al. |
| 2014/0064067 A1 * | 3/2014 | Drewes ................. H04L 5/0044 370/230 |

(Continued)

FOREIGN PATENT DOCUMENTS

| WO | WO-2014051333 A1 * | 4/2014 | ............ H04W 36/22 |
| WO | 2015012507 | 1/2015 | |

OTHER PUBLICATIONS

NEC, "Details of the DL Frequency Hopping Scheme for LTE Rel-13 MTC," R1-152674, 3GPP TSG-RAN WG1 Meeting #81, Fukuoka, Japan, May 15, 2015, see pp. 1-3.

(Continued)

*Primary Examiner* — Christopher R Crompton
(74) *Attorney, Agent, or Firm* — Dentons US LLP

(57) ABSTRACT

A method and apparatus for randomization of interference in a cellular Internet of things (IoT) system is disclosed. The method for randomization of interference in the cellular IoT system may comprise the steps of: allocating a radio resource for a physical broadcast channel (PBCH) by a base station; and transmitting downlink data to a plurality of terminals through the PBCH by the base station on the basis of a broadcast, wherein the PBCH may be transmitted on N (herein, N is natural number) slots, the radio resource may (Continued)

be determined on the basis of frequency hopping, and the frequency hopping may be performed in a plurality of frequency areas included in the entire whole frequency bandwidth.

8 Claims, 7 Drawing Sheets

(51) Int. Cl.
| | | |
|---|---|---|
| *H04L 29/08* | (2006.01) | |
| *H04L 27/26* | (2006.01) | |
| *H04W 72/04* | (2009.01) | |
| *H04W 72/00* | (2009.01) | |
| *H04J 11/00* | (2006.01) | |
| *H04W 4/70* | (2018.01) | |

(52) U.S. Cl.
CPC .......... *H04L 5/0044* (2013.01); *H04L 5/0073* (2013.01); *H04L 27/2655* (2013.01); *H04L 29/08* (2013.01); *H04W 72/005* (2013.01); *H04W 72/042* (2013.01); *H04L 5/0007* (2013.01); *H04W 4/70* (2018.02); *H04W 72/0446* (2013.01)

(58) Field of Classification Search
CPC ... H04L 5/0073; H04L 27/2655; H04L 29/08; H04L 5/0007; H04W 72/005; H04W 72/042; H04W 4/70; H04W 72/0446
USPC .......................................................... 370/350
See application file for complete search history.

(56) References Cited

U.S. PATENT DOCUMENTS

| | | | |
|---|---|---|---|
| 2014/0098761 A1 | 4/2014 | Lee et al. | |
| 2014/0301305 A1* | 10/2014 | Xu ........................ | H04W 72/04 370/329 |
| 2016/0205692 A1* | 7/2016 | Zhang ................... | H04W 48/12 370/329 |
| 2016/0345119 A1* | 11/2016 | Futaki ..................... | H04W 4/70 |

OTHER PUBLICATIONS

Ericsson, "Frequency Hopping for MTC," R1-152495, 3GPP TGS-RAN WG1 Meeting #81, Fukuoka, Japan, May 16, 2015, see pp. 1-3.

* cited by examiner

METHOD AND APPARATUS FOR RANDOMIZATION OF INTERFERENCE IN CELLULAR INTERNET OF THINGS (IOT) SYSTEM

CROSS-REFERENCE TO RELATED APPLICATIONS

This application is the National Stage filing under 35 U.S.C. 371 of International Application No. PCT/KR2016/002837, filed on Mar. 22, 2016, which claims the benefit of U.S. Provisional Application No. 62/183,740 filed on Jun. 24, 2015, the contents of which are all hereby incorporated by reference herein in their entirety.

BACKGROUND OF THE INVENTION

Field of the Invention

The present invention relates to interference randomization, and more particularly, to a method and an apparatus for randomizing interference in a cellular Internet of Things (IoT) system.

Related Art

Fifth generation (5G) mobile communication is a next-generation mobile communication technology that is 1000 times faster than fourth generation (4G) mobile communication and has a transmission speed of about 1 gigabit per second (Gbps) per individual and a service delay time of microseconds (msec) or less. 5G mobile communication is under discussion based on the following mobile services trends.

Since mobile traffic has been increasing at an incredible speed with the exploding demand for multimedia and social networking services in recent years and the number of things is continuously increasing due to the appearance of Internet of Things (IoT), traffic volume is expected to further explosively increase.

It is also expected that the number of mobile devices and things connected to the Internet will explosively increase.

Furthermore, with the increasing demand from users for cloud computing systems, transition from the PC era to the mobile cloud computing era is expected to further accelerate.

In addition, 5G mobile services are expected to bring a transform that provides users with necessary services mostly based on mobile cloud computing systems, and to offer a variety of mobile convergence services, such as augmented reality/virtual reality, location-based services with ultrahigh accuracy, hologram services, and smart health care services.

The aforementioned four major megatrends (a traffic increase, an increase in the number of devices, an increase in dependency on cloud computing, and the emergence of various 5G-based convergence services) need to be essentially considered in designing 5G mobile communication systems. In view of these aspects, different countries and companies have recently proposed basic performance indicators for 5G mobile communication systems. The International Telecommunication Union (ITU) Radiocommunication Sector (ITU-R) Working Party (WP) 5D provides three application scenarios depending on requirements, such as up to 20 Gbps transmission rate/100 Mbps or higher broadband transmission per user, large-scale connectivity to connect more than one million devices per 1 km$^2$, and 1-ms ultra-low latency and ultra-reliability in a radio access period, in order that users notice improved performance of 5G (generation) systems.

SUMMARY OF THE INVENTION

An object of the present invention is to provide a method for randomizing interference in a cellular Internet of Things (IoT) system.

Another object of the present invention is to provide an apparatus performing an interference randomization method in a cellular IoT system.

To achieve the foregoing objects of the present invention, a method for randomizing interference in a cellular Internet of Things (IoT) system according to an aspect of the present invention may include: allocating, by a base station (BS), a radio resource for a physical broadcast channel (PBCH); and transmitting, by the BS, downlink data to a plurality of terminals through the PBCH based on broadcasting, wherein the PBCH is transmitted on N (where N is a natural number) slots, the radio resource is determined based on frequency hopping, and the frequency hopping is performed over a plurality of frequency domains included in an entire frequency bandwidth.

To achieve the foregoing objects of the present invention, a base station (BS) performing a method for randomizing interference in a cellular Internet of Things (IoT) system according to another aspect of the present invention may include: a radio frequency (RF) unit to communicate with a terminal; and a processor operatively connected to the RF unit, wherein the processor is configured to: allocate a radio resource for a physical broadcast channel (PBCH); and transmit downlink data to a plurality of terminals through the PBCH based on broadcasting, the PBCH is transmitted on N (where N is a natural number) slots, the radio resource is determined based on frequency hopping, and the frequency hopping is performed over a plurality of frequency domains included in an entire frequency bandwidth.

It is possible to reduce interference with a PBCH by a PSCH transmitted on a different cell.

DESCRIPTION OF EXEMPLARY EMBODIMENTS

Figure 1:
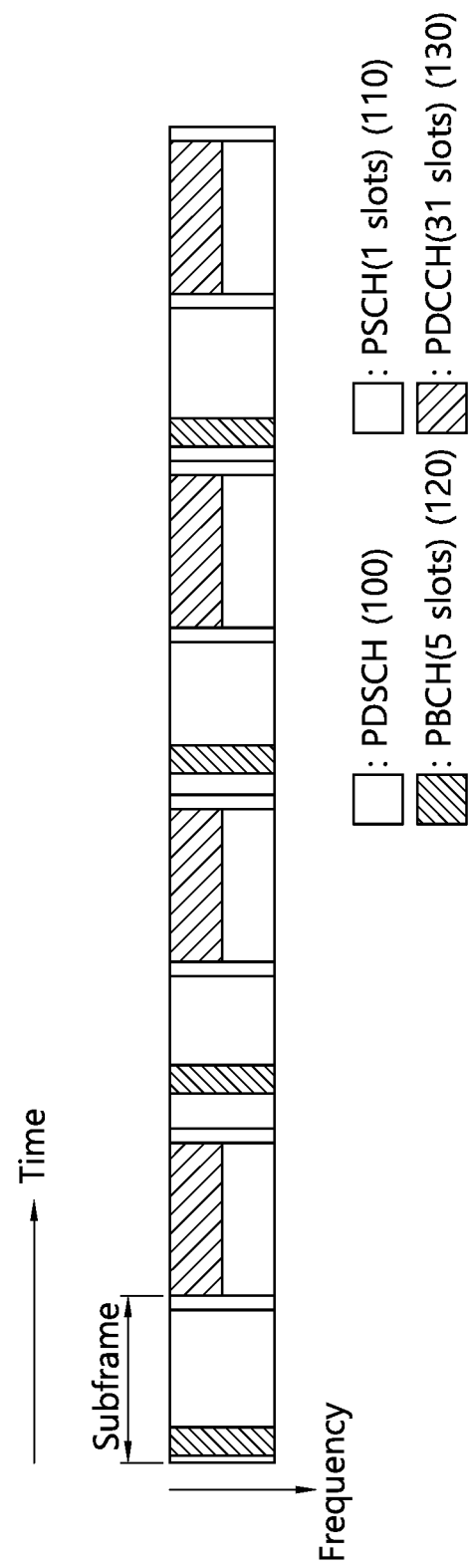
FIG. 1 is a conceptual view illustrating the allocation of a channel on a radio resource according to an embodiment of the present invention.

FIG. 1 is a conceptual view illustrating the allocation of a channel on a radio resource according to an embodiment of the present invention.

Referring to FIG. 1, a physical downlink shared channel (PDSCH), a physical synchronization channel (PSCH), a physical broadcast channel (PBCH), and a physical downlink control channel (PDCCH) may be allocated on a radio resource.

The PDSCH may be a channel for a base station (BS) to transmit traffic data to a specific terminal. The PSCH may be a channel for transmitting a synchronization signal (for example, a primary synchronization signal (PSS) and a secondary synchronization signal (SSS)) for synchronization. The PBCH may be a channel for transmitting broadcast data to be received by a plurality of terminals in a cell. The PDCCH may be a channel for a BS to transmit control data to a specific terminal.

Each channel may be allocated on a radio resource determined based on orthogonal frequency division multiplexing (OFDM), and the radio resource may include a time resource and a frequency resource.

The time resource may be divided into subframe units including a plurality of OFDM symbols. A subframe may include a plurality of slots, each of which may include a plurality of OFDM symbols. The frequency resource may be divided into subcarrier units.

Each channel may be allocated on different radio resources. For example, the PBCH may be transmitted on five slots. The PDSCH may be transmitted on one slot, and the PDCCH may be transmitted on 31 slots.

When an unsynchronized channel is allocated and transmitted in each of a plurality of cells in an environment where a plurality of cells overlaps, interference between channels transmitted in the respective cells may occur.

Figure 2:
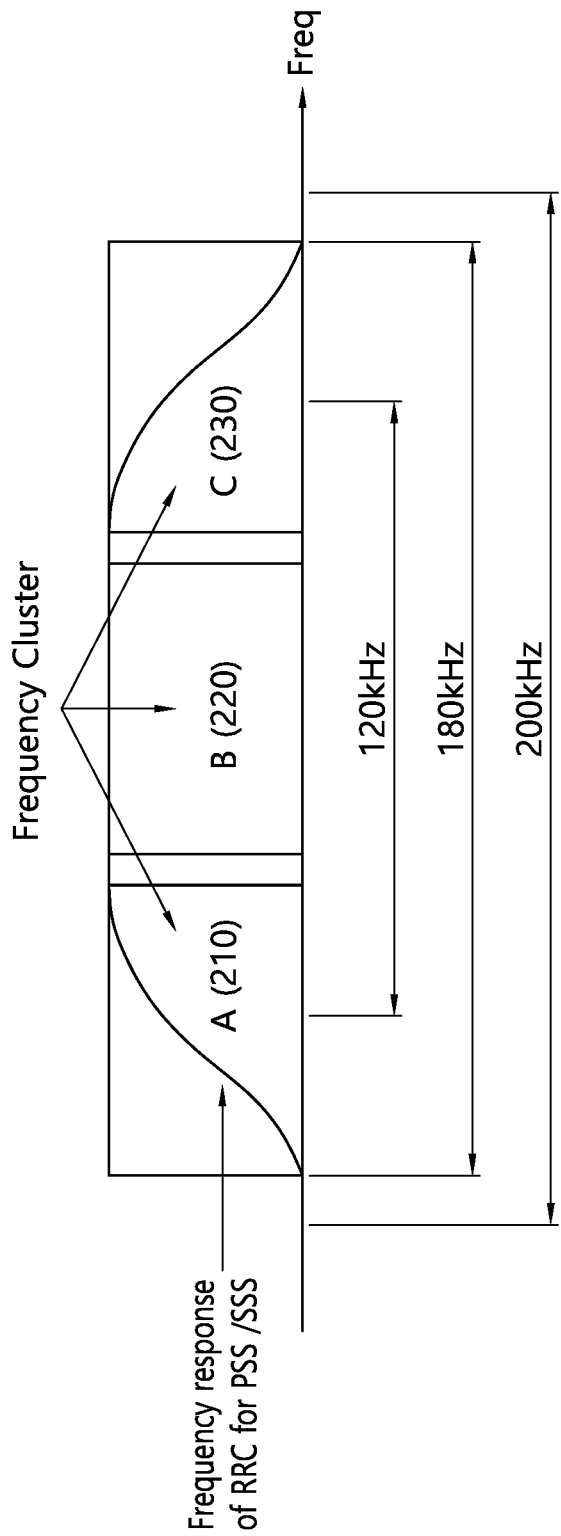
FIG. 2 is a conceptual view illustrating the allocation of a PSCH on a radio resource according to an embodiment of the present invention.

FIG. 2 is a conceptual view illustrating the allocation of a PSCH on a radio resource according to an embodiment of the present invention.

FIG. 2 shows the allocation of a PSCH on a radio resource and energy distribution in each frequency band.

Referring to FIG. 2, a PSCH may be defined based on x2 oversampling (x2 oversampling) and pulse shaping in a Cellular Internet of Things (CIoT) system. For example, x2 oversampling can reduce the frequency band for the PSCH from 240 Hz to 120 Hz through zero insertion or repetition of sample units. Pulse shaping can increase the frequency band from 120 Hz to 180 Hz by increasing the frequency bandwidth by 1.5 times. Hereinafter, suppose that the PSCH is defined on a 180 Hz band based on x2 oversampling and pulse shaping. On 180 kHz, 48 subcarriers may be allocated at a subcarrier spacing of 3.5 kHz.

When pulse shaping is used, energy may be non-uniformly distributed in the frequency domain. The energy of signals may be concentrated on the center frequency (for example, a direct current (DC) subcarrier), while the energy of signals may be reduced as distance from the center frequency increases.

For example, on the 180 Hz band, the PSCH may be allocated on subcarriers included in frequency domain A, frequency domain B, and frequency domain C, respectively, and frequency domain A, frequency domain B, and frequency domain C may each include 15 subcarriers. The remaining three subcarriers among the 48 subcarriers may be subcarriers disposed between the frequency domains and a DC subcarrier.

Here, due to non-uniform energy distribution by pulse shaping, a signal of the PSCH on frequency domain B may have greater energy than that of a signal of the PSCH on frequency domain A or frequency domain C. Therefore, frequency domain B may cause relatively greater interference with other cells than frequency domain A or frequency domain C cause.

For example, when a frequency reuse factor is 3, a signal on a first cell transmitted through frequency domain B (or 15 subcarriers including the DC subcarrier) may receive strong interference by a signal of the PSCH (or a synchronization signal transmitted from neighboring cells) on a second cell transmitted with relatively high energy through allocated frequency domain B.

When the frequency reuse factor is 1, a signal on the first cell transmitted through frequency domain B (or 15 subcarriers including the DC subcarrier) among signals on the first cell transmitted through frequency domains A, B and C may receive strong interference by a signal of the PSCH (or a synchronization signal transmitted from neighboring cells) on a second cell transmitted with relatively high energy through allocated frequency domain B.

Hereinafter, an embodiment of the present invention discloses an interference randomization method for reducing interference with a PBCH by a PSCH.

Figure 3:
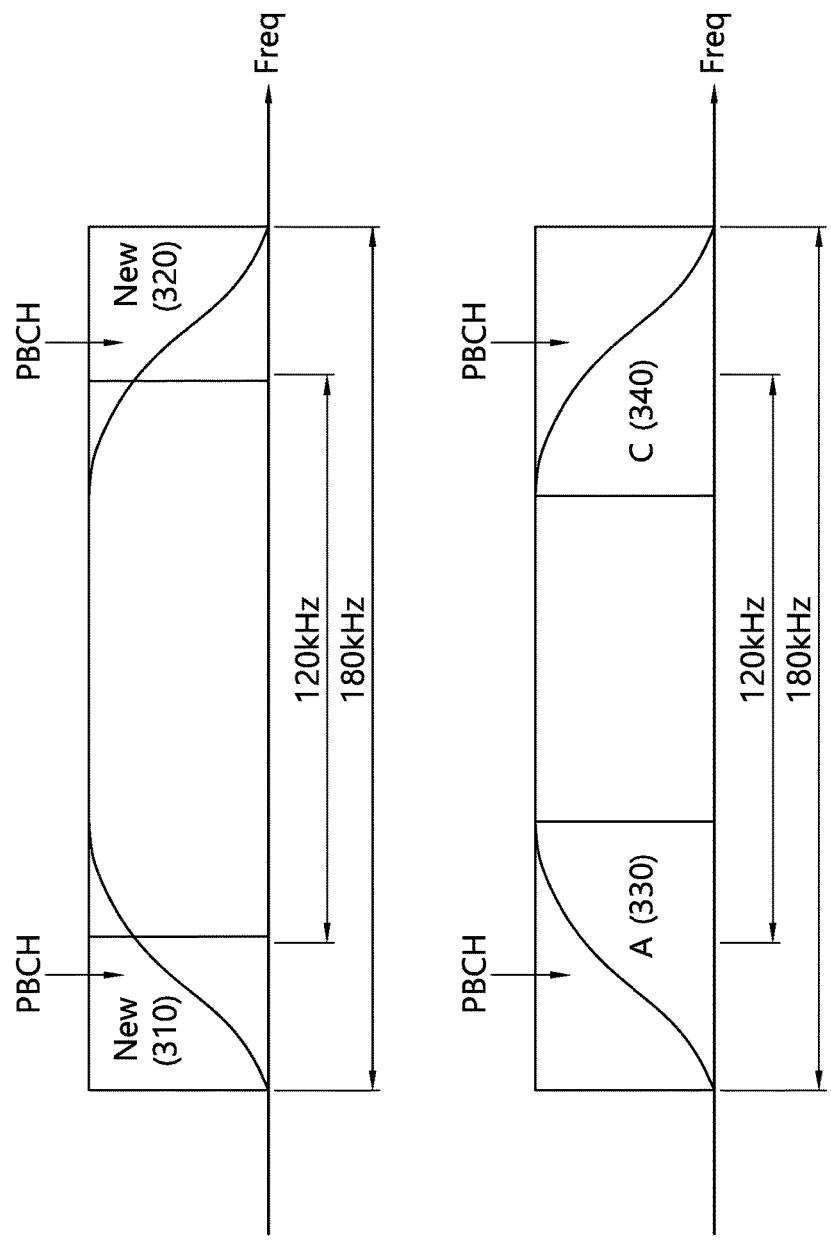
FIG. 3 is a conceptual view illustrating a method for allocating a resource for a PBCH according to an embodiment of the present invention.

FIG. 3 is a conceptual view illustrating a method for allocating a resource for a PBCH according to an embodiment of the present invention.

FIG. 3 discloses a method for allocating a resource for a PBCH on a frequency band (or subcarrier) with low energy causing less interference.

As described above, according to the energy distribution of a PSCH according to subcarrier based on pulse shaping, the energy level is the highest at the DC subcarrier and may decrease toward the end of an occupied bandwidth (or allocated frequency bandwidth).

Conventionally, N subcarriers (for example, N=15) near the DC subcarrier are used for PBCH transmission. In this case, interference with a PBCH by a PSCH on another cell may be significant. According to the embodiment of the present invention, to reduce interference with the PBCH by the PSCH on another cell, the PBCH may be allocated on a region having less interference by the PSCH. Specifically, a subcarrier located in a certain frequency range based on the DC subcarrier on the entire bandwidth is not allocated for the PBCH, but a subcarrier located outside the certain frequency range based on the DC subcarrier may be allocated for the PBCH.

That is, N subcarriers located at both ends of the occupied frequency bandwidth may be allocated for the PBCH.

Referring to the upper image of FIG. 3, an allocated BS may allocate, for the PBCH, seven or eight subcarriers located at both ends of the occupied frequency bandwidth (or the entire frequency bandwidth) based on the DC frequency. The entire frequency bandwidth may be 180 kHz based on x2 oversampling and pulse shaping as described above. The PBCH may be allocated a first frequency domain, which includes seven or eight subcarriers farthest in a frequency-increasing direction from the DC frequency among a plurality of subcarriers (for example, 48 subcarriers) included in 180 kHz, and a second frequency domain, which includes seven or eight subcarriers farthest in a frequency-decreasing direction from the DC frequency. By allocating frequencies for the PBCH in this manner, it is possible to avoid interference with the PBCH by the PSCH on another cell.

Referring to the lower image of FIG. 3, the BS may allocate, for the PBCH, 15 subcarriers located at one end or the other end of the occupied frequency bandwidth (or the entire frequency bandwidth) based on the DC frequency. The entire frequency bandwidth may be 180 kHz based on x2 oversampling and pulse shaping as described above. The PBCH may be allocated 15 subcarriers relatively farthest in the frequency-increasing direction from the DC frequency among the plurality of subcarriers (for example, 48 subcarriers) included in 180 kHz or 15 subcarriers relatively farthest in the frequency-decreasing direction from the DC frequency. This allocation for the PBCH is similar to frequency band allocation for a frequency reuse factor of 3, in which frequency domain A and frequency domain C may be allocated for the PBCH as described in FIG. 2.

Figure 4:
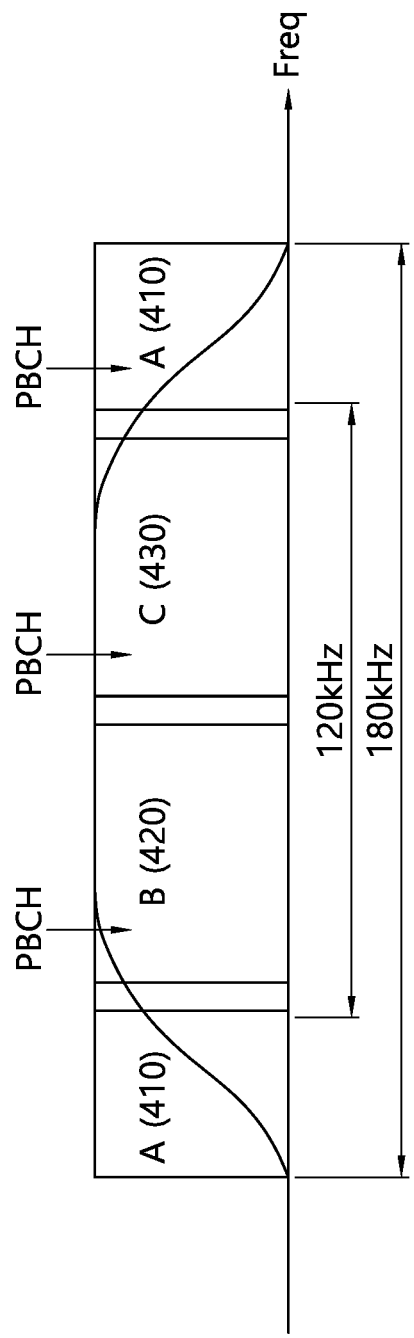
FIG. 4 is a conceptual view illustrating a method for allocating a resource for a PBCH according to an embodiment of the present invention.

FIG. 4 is a conceptual view illustrating a method for allocating a resource for a PBCH according to an embodiment of the present invention.

FIG. 4 illustrates a method for configuring a resource group allocated for a PBCH in a different form from that of a resource group used for frequency reuse of a PDSCH and for allocating a frequency for the PBCH.

Referring to FIG. 4, a separate frequency domain may be allocated for a PBCH in a different form from that of the frequency group illustrated above in FIG. 2. Frequency domain B and frequency domain C, which are divided by a DC subcarrier, may be allocated for the PBCH. Specifically, frequency domain B may be a domain in which a frequency increases from the DC subcarrier, and frequency domain C may be a domain in which a frequency decreases from the DC subcarrier. Frequency domain A may be allocated at one end of each of frequency domain B and frequency domain C. Specifically, frequency domain A may include divided frequency domain A1 and divided frequency domain A2, wherein divided frequency domain A1 may be located adjacent to the lowest frequency band in frequency domain B, and divided frequency domain A2 may be located adjacent to the highest frequency band in frequency domain C.

In this manner, the PBCH may be allocated one of frequency domain A, frequency domain B, and frequency domain C. By allocating a separate frequency for the PBCH, interference with the PBCH by a PSCH may be reduced.

Figure 5:
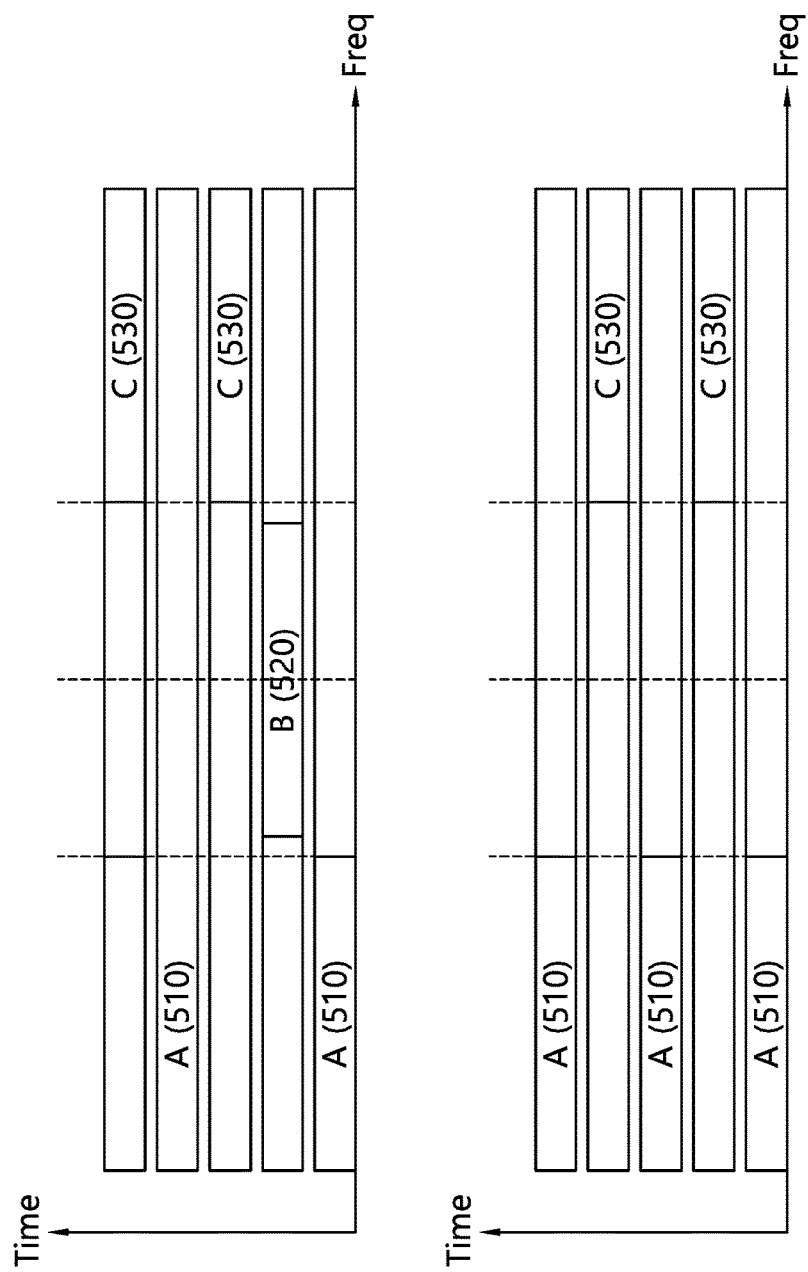
FIG. 5 is a conceptual view illustrating a method for allocating a resource for a PBCH according to an embodiment of the present invention.

FIG. 5 is a conceptual view illustrating a method for allocating a resource for a PBCH according to an embodiment of the present invention.

FIG. 5 illustrates a method for allocating a resource for a PBCH based on frequency hopping.

Referring to the upper image of FIG. 5, frequency hopping may be performed on a slot basis.

A PBCH may be allocated N (for example, five) slots in a PBCH transmission timing. As described above, a slot may be a time unit including a plurality of OFDM symbols, and M data symbols and reference symbols may be transmitted on a slot. Frequency hopping may be performed based on the PBCH transmission timing.

For example, when the entire frequency domain is divided into frequency domain A, frequency domain B, and frequency domain C for frequency reuse as illustrated in FIG. 2, a BS may sequentially allocate frequency domain A, frequency domain B, frequency domain C, frequency domain A, and frequency domain C for the PBCH over time as illustrated in the upper image of FIG. 5.

Specifically, a first PBCH may be transmitted through frequency domain A at the allocation time of the first PBCH. A second PBCH may be transmitted through frequency domain B at the next allocation time of the second PBCH after the allocation time of the first PBCH. A third PBCH may be transmitted through frequency domain C at the next allocation time of the third PBCH after the allocation time of the second PBCH. A fourth PBCH may be transmitted through frequency domain A at the next allocation time of the fourth PBCH after the allocation time of the third PBCH.

A fifth PBCH may be transmitted through frequency domain B at the next allocation time of the fifth PBCH after the allocation time of the fourth PBCH.

Such frequency hopping is repeated at a sixth PBCH allocation time to a tenth PBCH allocation time after the allocation time of the fifth PBCH, so that frequency hopping is performed in the order of frequency domain A, frequency domain B, frequency domain C, frequency domain A, and frequency domain C, thereby allocating frequency resources for the PBCH.

The foregoing frequency hopping pattern is one example, and various frequency hopping patterns may be used for allocating a frequency for a PBCH.

According to the embodiment of the present invention, a frequency hopping pattern may be determined in view of a pilot position. For example, a frequency hopping pattern may be determined in view of the position of a pilot signal while changing a frequency group unit between the frequency group units (for example, frequency domain A, frequency domain B, or frequency domain C) defined for frequency reuse that is used for frequency reuse, A frequency hopping pattern can be determined.

Referring to the lower image of FIG. 5, a resource group near a DC subcarrier among the frequency group units may be less frequently selected and allocated, or frequency hopping may be performed between only some frequency group units selected from among the frequency group units For example, a first PBCH may be transmitted through frequency domain A at the allocation time of the first PBCH. A second PBCH may be transmitted through frequency domain C at the next allocation time of the second PBCH after the allocation time of the first PBCH. Frequency hopping may be repeated in the foregoing order at a third PBCH allocation time and a fourth PBCH allocation time after the allocation time of the second PBCH, so that frequency hopping may be performed in the order of frequency domain A and frequency domain C. That is, frequency hopping may performed between frequency domain A and frequency domain C excluding frequency domain B including the DC subcarrier, thereby allocating frequency resources for the PBCH.

Figure 6:
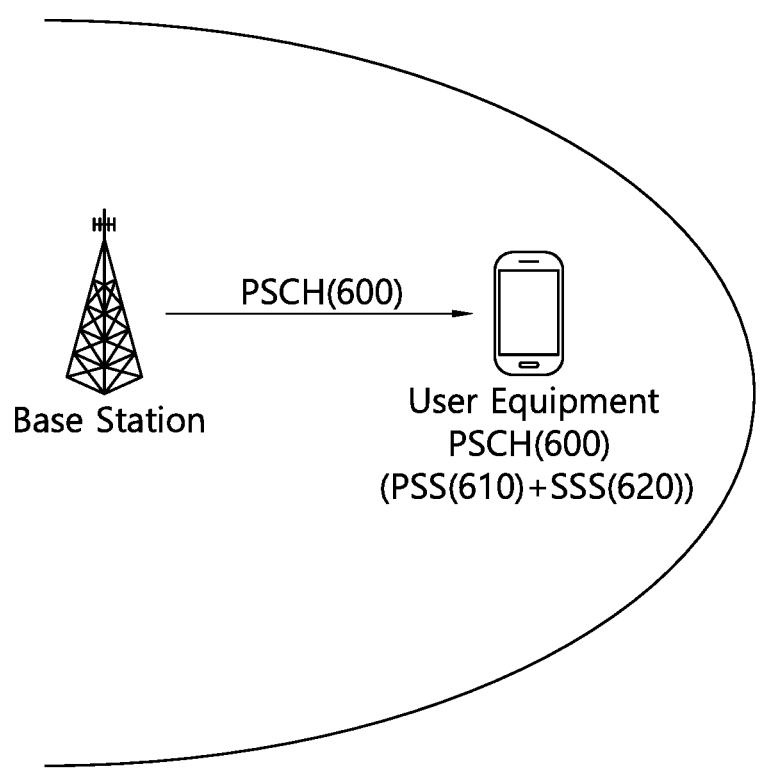
FIG. 6 is a conceptual view illustrating a method for allocating a resource for a PBCH according to an embodiment of the present invention.

FIG. 6 is a conceptual view illustrating a method for allocating a resource for a PBCH according to an embodiment of the present invention.

FIG. 6 illustrates a method for transmitting information on frequency hopping or a frequency reuse factor for a PBCH through a PSCH.

In a conventional method, a terminal does not have information on whether frequency reuse is applied in the transmission of a PBCH and/or, if frequency reuse is used, which resource group is used (hereinafter, referred to as PBCH allocation information).

According to the embodiment of the present invention, information on whether frequency reuse is applied and/or, if frequency reuse is used, information on which resource group is used may be transmitted via a PSCH.

A PSCH may include a primary synchronization signal (PSS) and a secondary synchronization signal (SSS). In the conventional case, no additional information is transmitted through the PSS, whereas information of 12 bits (six bits+six bits) in total may be transmitted through the SSS.

According to the embodiment of the present invention, PBCH allocation information may be transmitted through a PSS using the following methods.

For example, root sequence numbers for a PSS are defined as different values, and PBCH assignment information may be implicitly transmitted to a terminal based on the root sequence numbers.

In another example, sequences for PSS are generated using the same root sequence numbers as the conventional ones but the sequences for the PSS may be shifted based on a cyclic shift. PBCH allocation information may be implicitly mapped to shifting-related information on the cyclic shift to be transmitted to a terminal.

In still another example, mapping pattern information may be used by defining a mapping pattern of sequences for a PSS. PBCH allocation information may be implicitly mapped to the mapping pattern information to be transmitted to a terminal.

Conventionally, PSS 2 transmitted after PSS 1 may be set as the conjugate of the first PSS. For example, when the first PSS is (A+jB), the second PSS may be (A−jB).

Conventionally, when cross correlation is performed in a terminal, symbol timing detection performance may be improved based on the phase difference between PSS 1 and PSS 2.

In the embodiment of the present invention, PBCH allocation information may be transmitted through a PSCH based on a new definition of PSS 2. For example, when PSS 1 is (A+jB), PSS 2 may be defined as (−A+jB) to be transmitted. In this case, PSS 1+PSS 2 is 2A or 2jB. PBCH allocation information may be implicitly mapped to each of 2A and 2jB, and accordingly a terminal may detect whether PSS 1+PSS 2 is 2A or 2Bj and may receive the PBCH allocation information.

Also, according to the embodiment of the present invention, PBCH allocation information may be transmitted using some bits of the 12 bits (six bits+six bits) transmittable through the SSS.

Figure 7:
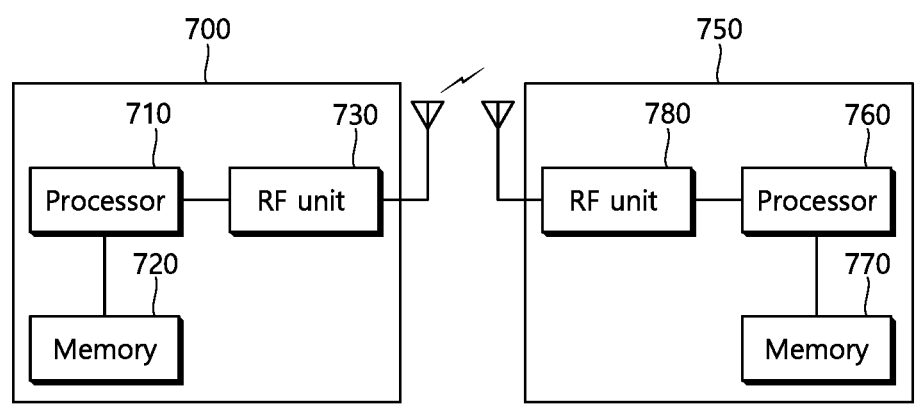
FIG. 7 is a block diagram illustrating a wireless device to which an embodiment of the present invention is applied.

FIG. 7 is a block diagram illustrating a wireless device to which the embodiments of the present invention can be applied.

Referring to FIG. 7, the wireless device may be a BS 700 or a terminal 750 that is capable of implementing the foregoing embodiments.

The BS 700 includes a processor 710, a memory 720, and an RF unit 730.

The RF unit 730 may be coupled to the processor 710 and may transmit/receive a radio signal.

The processor 710 may implement the functions, procedures, and/or methods proposed in the present invention. For example, the processor 710 may be configured to perform the operations of the BS according to the aforementioned embodiments of the present invention. The processor may perform the operations of the BS illustrated in the embodiments of FIGS. 1 to 6.

For example, the processor 710 may be configured to allocate a radio resource for a PBCH and to transmit downlink data to a plurality of terminals through the PBCH based on broadcasting. The PBCH may be transmitted on N (where N is a natural number) slots, the radio resource for the PBCH may be determined based on frequency hopping, and frequency hopping may be performed over a plurality of frequency domains included in the entire frequency bandwidth.

The entire frequency bandwidth may be a 180 kHz band determined based on x2 oversampling and pulse shaping and may include a first frequency domain, a second frequency domain, and a third frequency domain, wherein the first frequency domain may be a frequency band including a DC subcarrier, the second frequency domain may be a frequency band that does not overlap with the first frequency band and is lower than the first frequency band, and the third frequency domain may be a frequency band that does not overlap with the first frequency band and is higher than the first frequency band.

Further, the plurality of frequency bands may include the second frequency domain and the third frequency domain, and a frequency hopping pattern may be a combination of the second frequency domain and the third frequency domain.

In addition, the plurality of frequency bands may be determined in view of a pilot position, and a frequency hopping pattern may be a combination of the first frequency domain, the second frequency domain, and the third frequency domain.

The processor may be configured to transmit a synchronization signal to a plurality of terminals through a PSCH. The synchronization signal may include a PSS and an SSS, and the PSS or SSS may include information on the radio resource.

The terminal 750 includes a processor 760, a memory 770, and a communication unit or a RF unit 780.

The RF unit 780 may be coupled to the processor 760 and may transmit/receive a radio signal.

The processor 760 may implement the functions, procedures, and/or methods proposed in the present invention. For example, the processor 760 may be configured to perform the operations of the terminal according to the aforementioned embodiments of the present invention. The processor may perform the operations of the terminal 750 illustrated in the embodiments of FIGS. 1 to 6.

For example, the processor 760 may receive PBCH allocation information through a PSCH and may receive downlink data from a plurality of base stations through a PBCH.

The processors 710 and 760 may include an application-specific integrated circuit (ASIC), other chipsets, a logic circuit, a data processor, and/or a converter to convert a baseband signal and a radio signal from one to the other. The memories 720 and 770 may include a read-only memory (ROM), a random access memory (RAM), a flash memory, a memory card, a storage medium, and/or other storage devices. The RF units 730 and 780 may include at least one antenna to transmit and/or receive a radio signal.

When the embodiments are implemented with software, the foregoing techniques may be implemented by a module (process, function, or the like) for performing the foregoing functions. The module may be stored in the memories 720 and 770 and be executed by the processors 710 and 760. The memories 720 and 770 may be disposed inside or outside the processors 710 and 760 or be connected to the processors 710 and 760 via various well-known means.

What is claimed is:

1. A method for a base station (BS) in a cellular Internet of Things (IoT) system, the method comprising:

allocating, by the BS, a radio resource for a physical broadcast channel (PBCH); and transmitting, by the BS, downlink data to a plurality of terminals through the PBCH based on broadcasting, wherein the PBCH is transmitted on a plurality of time slots, the radio resource is determined based on frequency hopping, the frequency hopping is performed over a plurality of frequency domains comprised in an entire frequency bandwidth, the entire frequency bandwidth is a 180 kHz band determined based x2 oversampling and pulse shaping and comprises a first frequency domain, a second frequency domain, and a third frequency domain, the first frequency domain is a frequency band comprising a direct current (DC) subcarrier, the second frequency domain is a frequency band that does not overlap with the first frequency band and is lower than the first frequency band, and the third frequency domain is a frequency band that does not overlap with the first frequency band and is higher than the first frequency band.

2. The method of claim 1, wherein the plurality of frequency bands comprises the second frequency domain and the third frequency domain, and a pattern of the frequency hopping is a combination of the second frequency domain and the third frequency domain.

3. The method of claim 1, wherein the plurality of frequency bands is determined in view of a pilot position, and a pattern of the frequency hopping is a combination of the first frequency domain, the second frequency domain, and the third frequency domain.

4. The method of claim 1, further comprising:
transmitting, by the BS, a synchronization signal to the plurality of terminals through a physical synchronization channel (PSCH),
wherein the synchronization signal comprises a primary synchronization signal (PSS) and a secondary synchronization signal (SSS), and
the PSS or SSS comprises information on the radio resource.

5. A base station (BS) in a cellular Internet of Things (IoT) system, the BS comprising:
a radio frequency (RF) unit to communicate with a terminal; and
a processor operatively connected to the RF unit,
wherein the processor is configured to:
allocate a radio resource for a physical broadcast channel (PBCH); and
transmit downlink data to a plurality of terminals through the PBCH based on broadcasting, and
wherein the PBCH is transmitted on a plurality of slots, the radio resource is determined based on frequency hopping,
the frequency hopping is performed over a plurality of frequency domains comprised in an entire frequency bandwidth,
the entire frequency bandwidth is a 180 kHz band determined based on x2 oversampling and pulse shaping and comprises a first frequency domain, a second frequency domain, and a third frequency domain,
the first frequency domain is a frequency band comprising a direct current (DC) subcarrier,
the second frequency domain is a frequency band that does not overlap with the first frequency band and is lower than the first frequency band, and
the third frequency domain is a frequency band that does not overlap with the first frequency band and is higher than the first frequency band.

6. The BS of claim 5, wherein the plurality of frequency bands comprises the second frequency domain and the third frequency domain, and a pattern of the frequency hopping is a combination of the second frequency domain and the third frequency domain.

7. The BS of claim 5, wherein the plurality of frequency bands is determined in view of a pilot position, and a pattern of the frequency hopping is a combination of the first frequency domain, the second frequency domain, and the third frequency domain.

8. The BS of claim 5, wherein the processor is configured to transmit a synchronization signal to the plurality of terminals through a physical synchronization channel (PSCH),
the synchronization signal comprises a primary synchronization signal (PSS) and a secondary synchronization signal (SSS), and
the PSS or SSS comprises information on the radio resource.

* * * * *